US011860110B2

(12) United States Patent
Arai et al.

(10) Patent No.: US 11,860,110 B2
(45) Date of Patent: Jan. 2, 2024

(54) ARTICLE INSPECTION APPARATUS USING SPECTRUM ANALYZER

(71) Applicant: ANRITSU CORPORATION, Kanagawa (JP)

(72) Inventors: Shigeo Arai, Kanagawa (JP); Eiji Taniguchi, Kanagawa (JP); Takashi Suzuki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 17/814,034

(22) Filed: Jul. 21, 2022

(65) Prior Publication Data

US 2023/0035626 A1 Feb. 2, 2023

(30) Foreign Application Priority Data

Jul. 28, 2021 (JP) .................................. 2021-123075

(51) Int. Cl.
*G01N 21/95* (2006.01)
*G01N 21/84* (2006.01)
*G01N 21/88* (2006.01)

(52) U.S. Cl.
CPC ..... *G01N 21/9508* (2013.01); *G01N 21/8806* (2013.01); *G01N 2021/845* (2013.01)

(58) Field of Classification Search
CPC ......... G01N 21/9508; G01N 2021/845; G01N 21/8806; G01N 21/88
See application file for complete search history.

(56) References Cited

U.S. PATENT DOCUMENTS

| 2020/0011810 | A1* | 1/2020 | Akazawa | ................ | G01N 21/88 |
| 2021/0199594 | A1* | 7/2021 | Taguchi | .................. | B65B 5/103 |
| 2021/0356406 | A1* | 11/2021 | Romanovsky | ..... | G01N 21/8806 |
| 2023/0060883 | A1* | 3/2023 | Utsugi | ............... | G01N 21/8806 |
| 2023/0218174 | A1* | 7/2023 | Wilson | ................. | A61B 5/0075 |
| | | | | | 356/301 |

FOREIGN PATENT DOCUMENTS

JP 2020-060536 A 4/2020

* cited by examiner

*Primary Examiner* — Jennifer D Bennett
*Assistant Examiner* — Erin R Garber
(74) *Attorney, Agent, or Firm* — Pearne & Gordon, LLP (57) ABSTRACT

To provide an article inspection apparatus capable of sensitively and stably detecting a change in a spectrum when an unspecified foreign substance is contained and determining a defective product. A transport unit that transports a tablet for inspection to an article inspection position, a light irradiation unit that irradiates the tablet transported to the article inspection position with light, a light detection unit that detects light transmitted through the tablet, and an article inspection unit that inspects a quality of the tablet based on spectral characteristics of the light detected by the light detection unit are provided, and the article inspection unit standardizes a measured value of a spectrum of the light detected by the light detection unit for each wavelength and determines whether the tablet is a normal product or a defective product based on a standardized value.

12 Claims, 9 Drawing Sheets

ARTICLE INSPECTION APPARATUS USING SPECTRUM ANALYZER

TECHNICAL FIELD

The present invention relates to an article inspection apparatus.

BACKGROUND ART

Patent Document 1 describes a tablet inspection apparatus that irradiates a tablet with light from a light source and inspects the quality of the tablet according to the spectral characteristics of a transmitted light emitted from the tablet.

RELATED ART DOCUMENT

Patent Document

[Patent Document 1] JP-A-2020-60536

DISCLOSURE OF THE INVENTION

Problem that the Invention is to Solve

As described above, in a case where an article is inspected based on the spectral characteristics of transmitted light and reflected light of the article, for example, in near-infrared (NIR) analysis, from spectral information, spectrum conversion processing such as absorbance calculation, smoothing processing, and differential processing is performed, and the magnitude of a specific peak and the result of calculation processing that creates a calibration curve by machine learning are used to determine whether the article is a normal product or a defective product.

However, it may not be known whether a specific peak is an optimum peak for detecting an abnormality, or in a case where a foreign substance is contained in, it may not be possible to detect that the article is a defective product based on that peak.

Even in the processing using the calibration curve, it is possible to specialize in detecting a specific object, but in other cases, there is a problem that the detection capacity cannot be guaranteed.

Therefore, it is an object of the present invention to provide an article inspection apparatus capable of sensitively and stably detecting a change in a spectrum when an unspecified foreign substance is contained and determining a defective product.

Means for Solving the Problem

An article inspection apparatus according to a first aspect of the present invention includes a transport unit that transports an article for inspection to an article inspection position, a light irradiation unit that irradiates the article transported to the article inspection position with light, a light detection unit that detects light transmitted through or reflected from the article, and an article inspection unit that inspects a quality of the article based on spectral characteristics of the light detected by the light detection unit, and the article inspection unit standardizes a measured value of a spectrum of the light detected by the light detection unit for each wavelength and determines whether the article is a normal product or a defective product based on a standardized value.

With this configuration, the measured value for each wavelength of the measured spectrum is standardized, and it is determined whether the article is a normal product or a defective product based on the standardized value. Therefore, when an unspecified foreign substance is contained, the change in the spectrum can be sensitively and stably detected, and the article can be determined as a defective product.

In addition, in a second aspect of the present invention of the article inspection apparatus according to the first aspect of the present invention, the article inspection unit calculates a statistical value of the measured value for each wavelength of the spectrum of the light detected by the light detection unit, and standardizes the measured value for each wavelength based on the statistical value.

With this configuration, the statistical value of the measured value for each wavelength of the spectrum of the spectral characteristics of the light detected by the light detection unit is calculated, and the measured value for each wavelength is standardized based on the statistical value. Therefore, when an unspecified foreign substance is contained, the change in the spectrum can be sensitively and stably detected, and the article can be determined as a defective product.

In addition, in a third aspect of the present invention of the article inspection apparatus according to the first aspect of the present invention, the article inspection unit determines whether the article is a normal product or a defective product based on a threshold value for the standardized value.

With this configuration, it is determined whether the article is a normal product or a defective product based on the threshold value for the standardized value. Therefore, it is possible to easily determine whether the article is a normal product or a defective product.

In addition, in a fourth aspect of the present invention of the article inspection apparatus according to the second aspect of the present invention, the article inspection unit determines whether the article is a normal product or a defective product based on a threshold value for the standardized value.

With this configuration, it is determined whether the article is a normal product or a defective product based on the threshold value for the standardized value. Therefore, it is possible to easily determine whether the article is a normal product or a defective product.

In addition, in a fifth aspect of the present invention of the article inspection apparatus according to the third aspect of the present invention, the article inspection unit sets, as the threshold value for the standardized value, an upper limit threshold value which is an upper limit value for determining that the standardized value is normal and a lower limit threshold value which is a lower limit value for determining that the standardized value is normal.

With this configuration, it is determined whether the article is a normal product or a defective product based on the upper limit threshold value and the lower limit threshold value. Therefore, it is possible to easily and accurately determine whether the article is a normal product or a defective product.

In addition, in a sixth aspect of the present invention of the article inspection apparatus according to the fourth aspect of the present invention, the article inspection unit sets, as the threshold value for the standardized value, an upper limit threshold value which is an upper limit value for determining that the standardized value is normal and a lower limit threshold value which is a lower limit value for determining that the standardized value is normal.

With this configuration, it is determined whether the article is a normal product or a defective product based on the upper limit threshold value and the lower limit threshold value. Therefore, it is possible to easily and accurately determine whether the article is a normal product or a defective product.

In addition, in a seventh aspect of the present invention of the article inspection apparatus according to the first aspect of the present invention, the article inspection unit determines whether the article is a normal product or a defective product based on a threshold value for an absolute value of the standardized value.

With this configuration, it is determined whether the article is a normal product or a defective product based on the threshold value for the absolute value of the standardized value. Therefore, it is possible to easily determine whether the article is a normal product or a defective product by combining the upper limit and lower limit threshold values into one.

In addition, in an eighth aspect of the present invention of the article inspection apparatus according to the second aspect of the present invention, the article inspection unit determines whether the article is a normal product or a defective product based on a threshold value for an absolute value of the standardized value.

With this configuration, it is determined whether the article is a normal product or a defective product based on the threshold value for the absolute value of the standardized value. Therefore, it is possible to easily determine whether the article is a normal product or a defective product by combining the upper limit and lower limit threshold values into one.

In addition, in a ninth aspect of the present invention of the article inspection apparatus according to the third aspect of the present invention, the article inspection unit sets the threshold value for the standardized value for each range divided in a wavelength direction.

With this configuration, the threshold value is set for each range divided in the wavelength direction. Therefore, depending on the characteristics of the article, a normal range can be narrowed or widened for each range of wavelengths, and it is possible to accurately determine whether the article is a normal product or a defective product.

In addition, in a tenth aspect of the present invention of the article inspection apparatus according to the fourth aspect of the present invention, the article inspection unit sets the threshold value for the standardized value for each range divided in a wavelength direction.

With this configuration, the threshold value is set for each range divided in the wavelength direction. Therefore, depending on the characteristics of the article, a normal range can be narrowed or widened for each range of wavelengths, and it is possible to accurately determine whether the article is a normal product or a defective product.

In addition, in an eleventh aspect of the present invention of the article inspection apparatus according to the third aspect of the present invention, the article inspection unit sets a range of wavelengths in which it is not determined whether the article is a normal product or a defective product by using the threshold value.

With this configuration, a range of wavelengths is provided in which it is not determined whether the article is a normal product or a defective product based on the threshold value. Therefore, a range of wavelengths that is not related to the determination of whether the article is a normal product or a defective product can be set as a range in which it is not determined whether the article is a normal product or a defective product, and it is possible to accurately determine whether the article is a normal product or a defective product by suppressing the influence of the value in the range of wavelengths that is not related to the determination.

In addition, in a twelfth aspect of the present invention of the article inspection apparatus according to the fourth aspect of the present invention, the article inspection unit sets a range of wavelengths in which it is not determined whether the article is a normal product or a defective product by using the threshold value.

With this configuration, a range of wavelengths is provided in which it is not determined whether the article is a normal product or a defective product based on the threshold value. Therefore, a range of wavelengths that is not related to the determination of whether the article is a normal product or a defective product can be set as a range in which it is not determined whether the article is a normal product or a defective product, and it is possible to accurately determine whether the article is a normal product or a defective product by suppressing the influence of the value in the range of wavelengths that is not related to the determination.

In addition, in a thirteenth aspect of the present invention of the article inspection apparatus according to the third aspect of the present invention, the threshold value is set based on a standardized value of a measured value of a normal product of the article.

With this configuration, the threshold value is set based on the standardized value of the measured value of the normal product of the article. Therefore, the threshold value can be set by reflecting the characteristics of the normal product, and it is possible to accurately determine whether the article is a normal product or a defective product.

In addition, in a fourteenth aspect of the present invention of the article inspection apparatus according to the fourth aspect of the present invention, the threshold value is set based on a standardized value of a measured value of a normal product of the article.

With this configuration, the threshold value is set based on the standardized value of the measured value of the normal product of the article. Therefore, the threshold value can be set by reflecting the characteristics of the normal product, and it is possible to accurately determine whether the article is a normal product or a defective product.

In addition, in a fifteenth aspect of the present invention of the article inspection apparatus according to the first aspect of the present invention, the article inspection unit standardizes a value of a result obtained by performing spectrum conversion processing on the spectrum of the light detected by the light detection unit for each wavelength, and determines whether the article is a normal product or a defective product based on the standardized value.

With this configuration, the value of the result obtained by performing the spectrum conversion processing on the spectrum of the spectral characteristics of the light detected by the light detection unit is standardized for each wavelength, and it is determined whether the article is a normal product or a defective product based on the standardized value. Therefore, when an unspecified foreign substance is contained, the change in the spectrum can be sensitively and stably detected, and the article can be determined as a defective product.

In addition, in a sixteenth aspect of the present invention of the article inspection apparatus according to the second aspect of the present invention, the article inspection unit standardizes a value of a result obtained by performing spectrum conversion processing on the spectrum of the light detected by the light detection unit for each wavelength, and determines whether the article is a normal product or a defective product based on the standardized value.

With this configuration, the value of the result obtained by performing the spectrum conversion processing on the spectrum of the spectral characteristics of the light detected by the light detection unit is standardized for each wavelength, and it is determined whether the article is a normal product or a defective product based on the standardized value. Therefore, when an unspecified foreign substance is contained, the change in the spectrum can be sensitively and stably detected, and the article can be determined as a defective product.

Advantage of the Invention

The present invention can provide an article inspection apparatus capable of sensitively and stably detecting a change in a spectrum when an unspecified foreign substance is contained and determining a defective product.

BEST MODE FOR CARRYING OUT THE INVENTION

Hereinafter, an article inspection apparatus according to the embodiment of the present invention will be described in detail with reference to the drawings.

Figure 1:
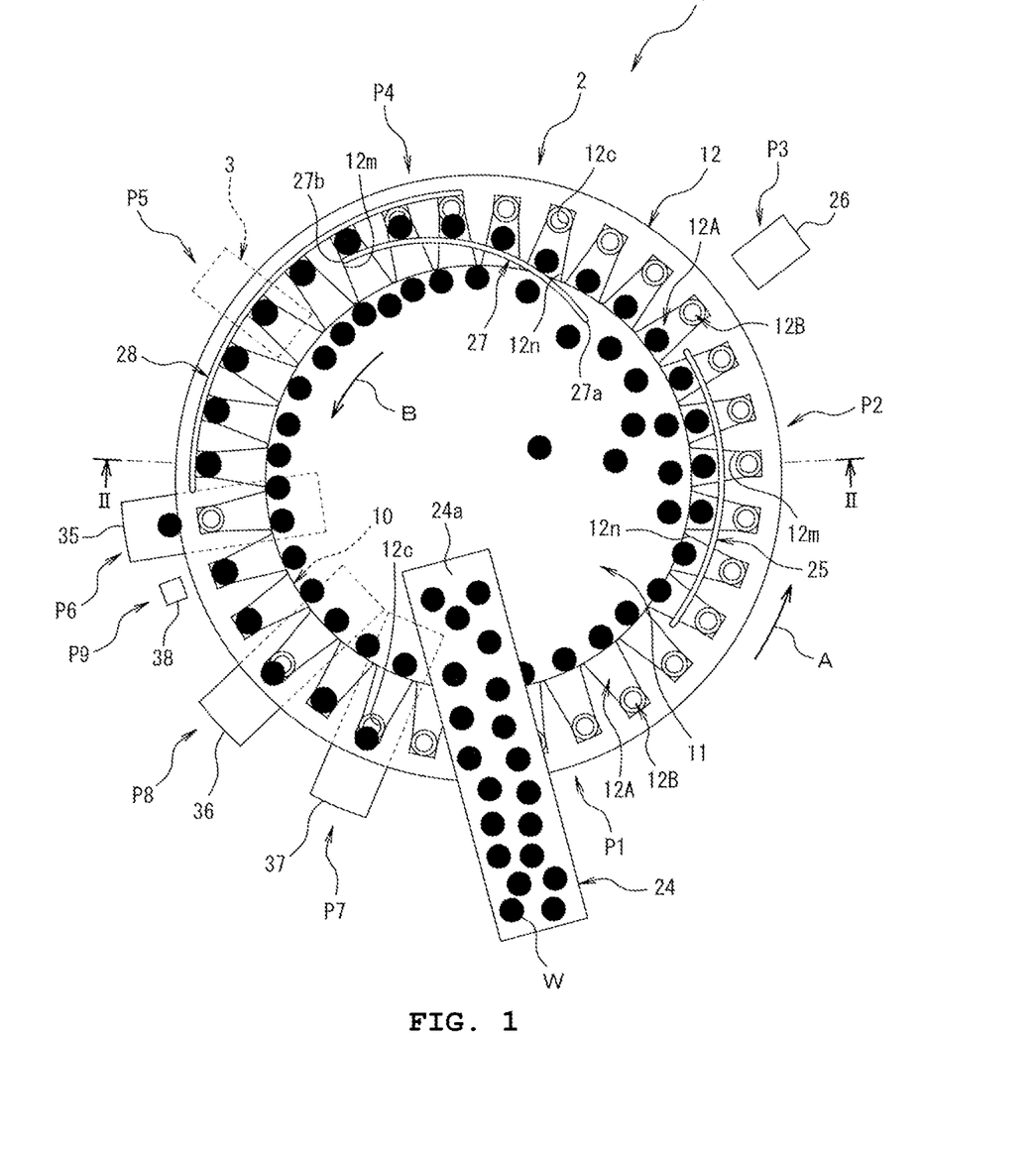
FIG. 1 is a schematic plan view of an article inspection apparatus according to an embodiment of the present invention.

In FIG. 1, an article inspection apparatus 1 according to the embodiment of the present invention irradiates light at a predetermined article inspection position while arranging the articles to be inspected and transporting the articles individually, and inspects the quality of the article based on the spectral characteristics of the light irradiated and then transmitted through the article.

The article to be inspected is an article having a small diameter whose light irradiation region is relatively close to the diameter of the irradiation port for irradiating the article to be inspected with light, and includes an article having a predetermined shape and a molded article manufactured by an existing manufacturing facility or a manufacturing facility having no inspection function, and particularly an article whose shape does not change during the transportation process, in addition to an article having an outer diameter cp: several mm to several tens of mm that can be transported individually without packaging, and a bite-sized article.

Examples of the articles include a tablet, a capsule, a troche, a preparation such as a drop, a candy, a chocolate, and the like. Hereinafter, as an article to be inspected, a tablet W having a circular shape in a plan view and a substantially columnar in a side view having a small height (thickness) compared to the diameter will be described as an example. The tablet W of the present embodiment constitutes an article.

As illustrated in FIG. 1, the article inspection apparatus 1 is provided with an article transport device 2 that transports the tablet W along a circumferential transport course, and an article inspection unit 3 that inspects the tablets W at an article inspection position P5 in the middle of the transport course.

Figure 2:
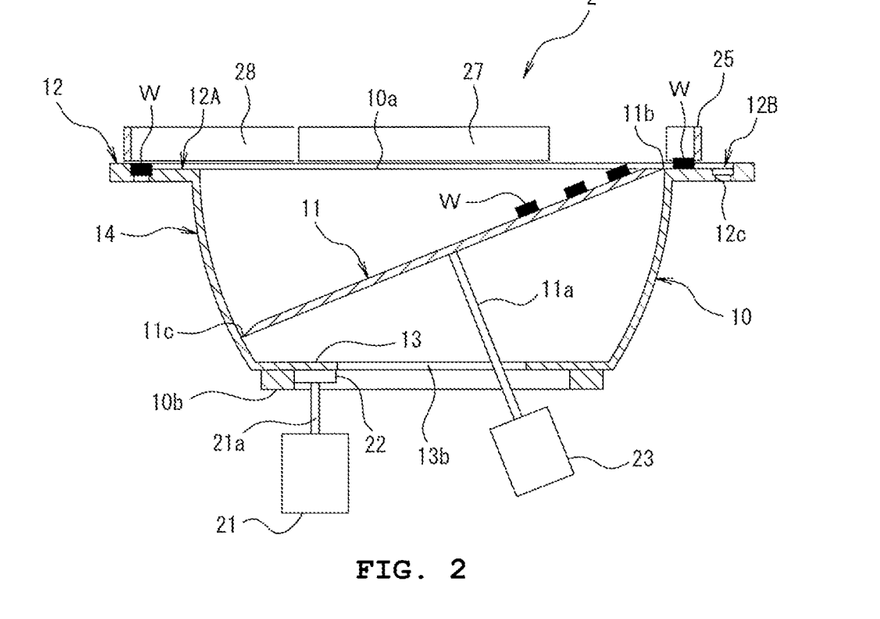
FIG. 2 is a cross-sectional view of a supply container of the article inspection apparatus according to the embodiment of the present invention cut in the direction II-II of FIG. 1.

As illustrated in FIG. 2, a supply container 10 is formed in a circular shape in which the upper surface is opened and the cross-sectional area gradually decreases from the upper surface to the lower side. The supply container 10 is a horizontal annular flange provided in the opening portion 10a on the upper surface with a predetermined width over the entire circumference, and is provided with an outer transport unit 12 serving as a transport path for the tablet W, a circular bottom wall 13 having a through-hole 13b in a part and having a diameter smaller than that of the outer transport unit 12, and a cylindrical side wall 14 connecting the outer transport unit 12 and the bottom wall 13.

An inner transport unit 11 of the present embodiment is provided inward in the radial direction of the outer transport unit 12. In other words, the outer transport unit 12 is provided on the outer side in the radial direction of the inner transport unit 11 so as to surround the periphery of the inner transport unit 11 in the top view of the article transport device 2.

The supply container 10 is rotatably attached to a main body frame (not illustrated). The axis of rotation of the supply container 10 passes through the center of the bottom wall 13 and coincides with a line perpendicular to the bottom wall 13. An annular internal tooth gear 10b is fixed to the lower surface of the bottom wall 13 of the supply container 10 with the center aligned with the bottom wall 13.

A first motor 21 is attached to the main body frame, and a pinion 22 provided on a drive shaft 21a of the first motor 21 meshes with the internal tooth gear 10b. When the first motor 21 is driven, the supply container 10 (outer transport unit 12) rotates around the rotation center axis in the rotation direction A (refer to FIG. 1). In the present embodiment, the rotation direction A of the supply container 10 is the counterclockwise rotation direction in a plan view of the article transport device 2.

As illustrated in FIGS. 1 and 2, the inner transport unit 11 is inclined and disposed inside the supply container 10. Since the diameter of the inner transport unit 11 is larger than the diameter of the bottom wall 13 of the supply container 10, the inner transport unit 11 can be inclined and stored in the supply container 10. That is, since the supply container 10 is formed in a circular shape in which the upper surface is open and the cross-sectional area decreases from the upper surface toward the bottom wall 13, the inner transport unit 11 can be inclined and stored in the supply container 10.

As illustrated in FIG. 2, an upper end portion 11b of the inner transport unit 11 in the inclined direction faces an upper edge of the side wall 14 of the supply container 10, and a lower end portion 11c of the inner transport unit 11 in the inclined direction located 180° opposite to the upper end portion 11b in the circumferential direction, faces a lower edge of the side wall 14 of the supply container 10.

That is, the lower end portion 11c of the inner transport unit 11 in the inclined direction has the lowest portion facing the lower edge of the side wall 14 of the supply container 10, and the upper end portion 11b of the inner transport unit 11 in the inclined direction has the highest portion facing the upper edge of the side wall 14 of the supply container 10. A drive shaft 11a (refer to FIG. 2) is fixed perpendicularly to the inner transport unit 11 at the center of the lower surface of the inner transport unit 11, and the drive shaft 11a is connected to a second motor 23 (refer to FIG. 2) by inserting the through-hole 13b of the bottom wall 13 of the supply container 10 in an inclined state.

The second motor 23 is attached to the main body frame that supports the supply container 10, and when the second motor 23 is driven, the inner transport unit 11 rotates around the drive shaft 11a in the rotation direction B (refer to FIG. 1) inside the supply container 10. The rotation direction B of the inner transport unit 11 and the rotation direction A of the outer transport unit 12 are the same direction.

As illustrated in FIG. 1, the article transport device 2 is provided with an article supply unit 24, and the article supply unit 24 is installed above the article transport device 2. For example, when a tablet W of a molded product manufactured by an existing manufacturing facility or a manufacturing facility having no inspection function is loaded, the article supply unit 24 accumulates the loaded tablet W, discharges the accumulated tablet W from a discharge port 24a to an article loading position P1, and supplies the accumulated tablet W to the inner transport unit 11 at the article loading position P1.

The article supply unit 24 transports the loaded tablet W to the inner transport unit 11, and is configured to include, for example, a linear feeder or a conveyor.

The article supply unit 24 has a function of supplying the tablet W according to the capacity of the inner transport unit 11 and the outer transport unit 12 to transport the tablet W. In other words, in the article supply unit 24, the supply amount of the tablet W to the inner transport unit 11 is set according to the capacity of the article transport device 2 to transport the tablet W (for example, the number of tablets W transported per unit time).

In the article transport device 2, when the first motor 21 and the second motor 23 are driven in the same direction at the same speed or at different speeds, while loading the tablet W from the article supply unit 24 into the inner transport unit 11, and each of the inner transport unit 11 and the supply container 10 are rotated at the same speed in the rotation direction A and the rotation direction B, the tablet W fallen to the lowest portion (lower end portion 11c side in the inclined direction) of the article supply unit 24 moves to the highest portion (upper end portion 11b side in the inclined direction) of the inner transport unit 11 as the inner transport unit 11 rotates, and is placed on the outer transport unit 12.

Figure 3:
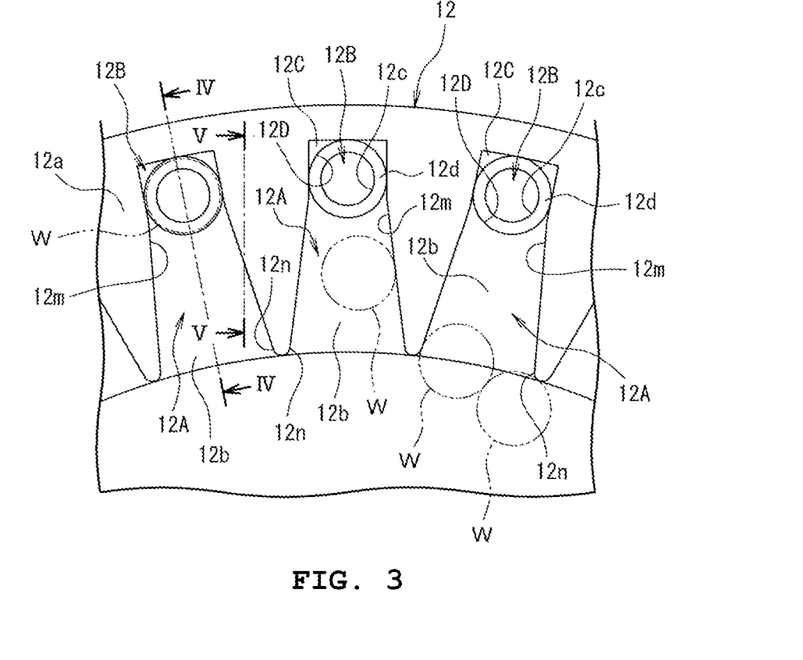
FIG. 3 is an enlarged view of a part of a groove portion and a storage portion of an outer transport unit of the article inspection apparatus according to the embodiment of the present invention.
Figure 4:
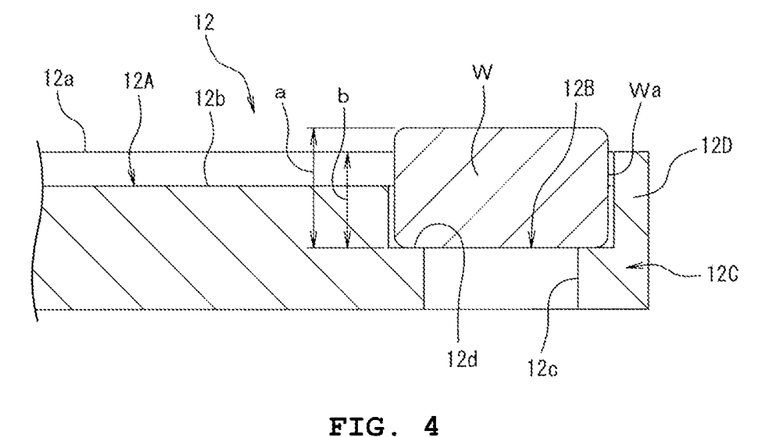
FIG. 4 is an arrow cross-sectional view in the direction IV-IV of FIG. 3.
Figure 5:
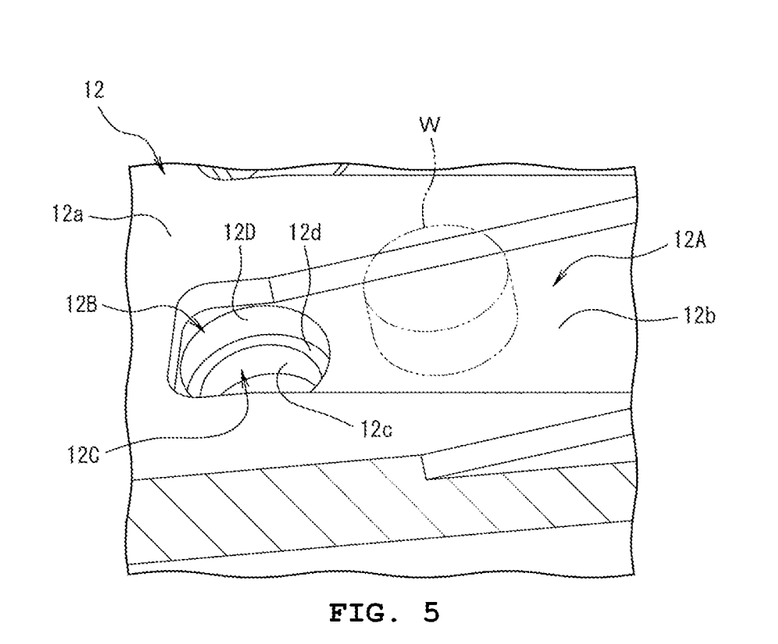
FIG. 5 is a view of a cross section in the direction V-V of FIG. 3 viewed from diagonally above.

As illustrated in FIGS. 1 and 3, the outer transport unit 12 is provided with a groove portion 12A and a storage groove 12B. As illustrated in FIGS. 4 and 5, the groove portion 12A is recessed downward from an upper surface 12a of the outer transport unit 12 and extends in the radial direction of the outer transport unit 12. The storage groove 12B of the present embodiment constitutes a storage portion.

A plurality of groove portions 12A are provided side by side at equal intervals in the circumferential direction of the outer transport unit 12, and these plurality of groove portions 12A are adjacent to each other in the circumferential direction of the outer transport unit 12 with the upper surface 12a of the outer transport unit 12 interposed therebetween.

As illustrated in FIG. 3, the groove portion 12A is formed so that the width in the circumferential direction gradually narrows from an inner end portion 12n toward an outer end portion 12m of the outer transport unit 12 in the radial direction. The width of the inner end portion 12n of the groove portion 12A in the circumferential direction is formed to be smaller than the width when the tablets W are arranged in two in the circumferential direction, that is, the width twice the diameter of the tablet W (or smaller than the width when two tablets W are arranged vertically and horizontally in the circumferential direction), and is formed in a shape in which two tablets W are difficult to enter at the same time.

The tablet W that rides on the outer transport unit 12 due to the rotation of the inner transport unit 11 enters the groove portion 12A from the inner end portion 12n of the groove portion 12A in the radial direction, is guided from the groove portion 12A to the storage groove 12B by the centrifugal force due to the rotation of the outer transport unit 12 and an article guide unit 27 described later, and is stored in the storage groove 12B.

As illustrated in FIGS. 3 and 4, the storage groove 12B is located radially outward of the outer transport unit 12 with respect to the groove portion 12A. The storage groove 12B may be formed in a circular shape slightly larger than the tablet W in a plan view, may be recessed below a bottom surface 12b of the groove portion 12A, or may have the same height as that of the groove portion 12A.

Specifically, the storage groove 12B is provided with a bottom wall 12C having an annular mounting surface 12d located below the bottom surface 12b of the groove portion 12A. The bottom wall 12C is formed with a circular opening portion 12c located inside the mounting surface 12d and through which inspection light passes. That is, the mounting surface 12d is provided radially outward of the opening portion 12c so as to surround the circular opening portion 12c, and the tablet W is placed on the annular mounting surface 12d so as to close the opening portion 12c from above.

The storage groove 12B extends upward from the bottom wall 12C and is provided with a peripheral wall 12D that surrounds an outer peripheral side surface Wa of the tablet W, and the tablet W is stored in the storage groove 12B in a state of being fitted.

Specifically, the peripheral wall 12D of the storage groove 12B is formed by a step between the bottom surface 12b of the groove portion 12A and the mounting surface 12d of the storage groove 12B, and a step between the upper surface 12a of the groove portion 12A and the mounting surface 12d of the storage groove 12B.

Since the opening portion 12c is formed to have a diameter smaller than the outer diameter of the tablet W in a plan view of the outer transport unit 12, in a state where the tablet W is stored in the storage groove 12B, the opening portion 12c is hidden from above, and the tablet W can be prevented from falling from the opening portion 12c.

The distance from the rotation center axis of the outer transport unit 12 to the central portions of all the storage grooves 12B is equal, and in a state where the tablet W is stored in the storage groove 12B, the tablet W is aligned in a row in the rotation direction of the outer transport unit 12. That is, the line connecting the central portion of the storage groove 12B (central portion of the opening portion 12c) in the rotation direction is a circle. As a result, when the outer transport unit 12 rotates, the tablets W stored in the storage groove 12B are aligned in a row in the rotation direction of the outer transport unit 12.

In addition, in a state where the tablet W is stored in the storage groove 12B, a gap between the outer peripheral side surface Wa of the tablet W and the peripheral wall 12D is significantly small. As a result, it is possible to prevent light from leaking from the gap between the tablet W and the peripheral wall 12D and prevent light from entering the gap between the tablet W and the peripheral wall 12D. That is, the peripheral wall 12D blocks the light incident on a light detection unit 32 described later from the outer peripheral side surface Wa of the tablet W. The peripheral wall 12D of the present embodiment constitutes a light-shielding portion, and the outer peripheral side surface Wa of the tablet W constitutes the outer peripheral side surface of the article.

The gap between the outer peripheral side surface Wa and the peripheral wall 12D of the tablet W and a gap between the outer peripheral side surface Wa and the bottom wall 12C of the tablet W are conditioned on the condition that the peripheral wall 12D can prevent light from leaking from the outer peripheral side surface Wa of the tablet W or light from entering from the outer peripheral side surface Wa, and the tablet W is set to a gap in which the tablet W is surely stored in the storage groove 12B.

As illustrated in FIG. 4, in a state where the tablet W is stored in the storage groove 12B, the dimension a of the tablet W in the height direction, that is, the dimension a from the mounting surface 12d of the storage groove 12B to the upper surface of the tablet W, is larger than the dimension b in the height direction from the mounting surface 12d of the storage groove 12B to the upper surface 12a of the groove portion 12A.

As a result, in the state where the tablet W is stored in the storage groove 12B, the upper surface of the tablet W protrudes upward from the upper surface 12a of the groove portion 12A.

In the state where the tablet W is stored in the storage groove 12B, the dimension a of the tablet W in the height direction may be smaller than the dimension b in the height direction from the mounting surface 12d of the storage groove 12B to the upper surface 12a of the groove portion 12A. In this case, in the state where the tablet W is stored in the storage groove 12B, the upper surface of the tablet W is located below the upper surface 12a of the groove portion 12A.

As illustrated in FIG. 1, the article transport device 2 is provided with an article regulation unit 25. The article regulation unit 25 regulates the number of tablets W to be supplied so that only one tablet W is supplied to the groove portion 12A, and aligns the tablets W in a row in the rotation direction of the outer transport unit 12.

The article regulation unit 25 is configured to include a guide plate that is curved and extended with a certain length in the rotation direction of the outer transport unit 12 and extends in the vertical direction, and is fixed to a main body frame that supports the supply container 10.

The article regulation unit 25 is provided at a regulation position P2 on the downstream side in the rotation direction of the outer transport unit 12 with respect to the article loading position P1. In other words, the article loading position P1 is installed on the upstream side of the article regulation unit 25 in a plan view of the article transport device 2. Here, the rotation direction of the outer transport unit 12 and the transport direction of the tablet W are the same direction.

When one tablet W is supplied from the inner transport unit 11 to the groove portion 12A through the radial inner end portion 12n of the groove portion 12A, the radial outer end portion of the tablet W comes into contact with the article regulation unit 25. That is, the radial dimension of the outer transport unit 12 at the inner end portion 12n of the article regulation unit 25 and the groove portion 12A is set to the same dimension as the diameter of the tablet W, a dimension slightly larger than the diameter of the tablet W, or a dimension slightly smaller than the diameter of the tablet W so that the tablet W does not fall from the groove portion 12A to the inner transport unit 11. As a result, the number of tablets W supplied is regulated so that only one tablet W is supplied to the groove portion 12A by the article regulation unit 25.

In addition, only one tablet W supplied to the groove portion 12A is regulated from moving outward in the radial direction of the outer transport unit 12 by the article regulation unit 25, and is transported toward the article inspection position P5 in a state of being aligned in a row in the rotation direction of the outer transport unit 12. The outer transport unit 12 of the present embodiment constitutes a transport unit.

The article transport device 2 is provided with an article adjustment unit 26. The article adjustment unit 26 is provided at an article adjusting position P3 on the downstream side of the outer transport unit 12 in the rotation direction with respect to the article regulation unit 25, returns the tablet W that is not located in the groove portion 12A in the normal posture to the normal posture in the groove portion 12A, and removes the tablet W protruding from the groove portion 12A from the groove portion 12A. Here, the normal posture of the tablet W is, for example, a posture in which the tablet W can smoothly move from the groove portion 12A to the storage groove 12B and can be stored sideways in the storage groove 12B.

The article adjustment unit 26 is configured to include a brush, air blower, an exclusion plate, and the like, and in a case where the tablet W supplied to the groove portion 12A rides on the upper surface 12a of the outer transport unit 12, adjusts the tablet so that the tablet has a normal posture in the groove portion 12A, or removes the tablet from the groove portion 12A.

In addition, when one tablet W has a poor posture (vertical orientation), the tablet W is removed from the groove portion 12A. The tablet W removed from the groove portion 12A is returned to the inner transport unit 11.

Specifically, in a case where the tablet W is located above the upper surface of the tablet W in the normal posture in the groove portion 12A, the article adjustment unit 26 adjusts the tablet W having a poor posture (posture correction or removal) by supplying air above the upper surface of the tablet W or by acting the exclusion plate.

The article transport device 2 is provided with an article guide unit 27. The article guide unit 27 is provided at an article guide position P4 on the downstream side in the rotation direction of the outer transport unit 12 with respect to the article adjustment unit 26, and guides the tablet W supplied to the groove portion 12A to the storage groove 12B along the groove portion 12A. The article guide unit 27 is configured to include a guide plate that is curved and extended with a certain length in the rotation direction of the outer transport unit 12 and extends in the vertical direction, and is fixed to a main body frame that supports the supply container 10.

The article guide unit 27 is configured to include a guide plate extending with a certain length from the inner end portion 12n toward the outer end portion 12m of the groove portion 12A in the rotation direction of the outer transport unit 12, and extending in the vertical direction. In the article guide unit 27, the upstream end portion 27a is located on the inner transport unit 11 side from the inner end portion 12n of the groove portion 12A in the radial direction of the outer transport unit 12, and the downstream end portion 27b is located on the inner end portion 12n side of the groove portion 12A from the storage groove 12B in the radial direction of the outer transport unit 12 and is located near the outer end portion 12m of the groove portion 12A.

The article guide unit 27 moves the tablets W arranged in a row in the rotation direction of the outer transport unit 12 on the inner end portion 12n side of the storage groove 12B at the regulation position P2 toward the storage groove 12B along the groove portion 12A with the rotation of the outer transport unit 12, and stores the tablets W in the storage groove 12B.

The tablet W stored in the storage groove 12B is transported to the article inspection unit 3 by the rotation of the outer transport unit 12. As illustrated in FIG. 1, the article inspection unit 3 is provided at the article inspection position P5 on the downstream side of the article guide position P4 in the rotation direction of the outer transport unit 12.

The article transport device 2 is provided with an article blocking unit 28. The article blocking unit 28 is provided from the middle in the rotation direction of the outer transport unit 12 of the article guide unit 27 to the downstream side of the article inspection position P5 in the rotation direction of the outer transport unit 12.

The article blocking unit 28 is configured to include a guide plate that is curved in the rotation direction of the outer transport unit 12, extended with a certain length, and extended in the vertical direction, and is fixed to a main body frame that supports the supply container 10.

The article blocking unit 28 prevents the tablet W stored in the storage groove 12B by the article guide unit 27 from moving outward in the radial direction from the storage groove 12B due to the centrifugal force due to the rotation of the outer transport unit 12.

Figure 6:
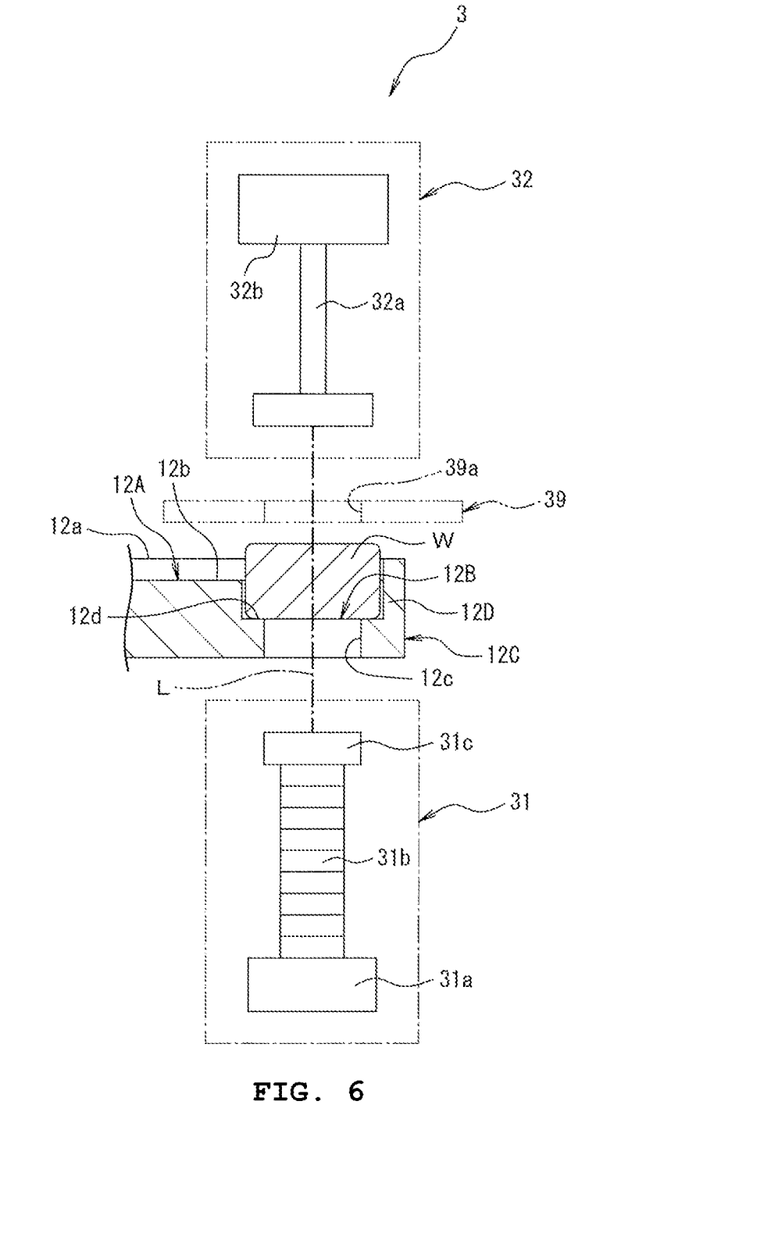
FIG. 6 is a schematic configuration diagram of an article inspection unit provided at an article inspection position of the article inspection apparatus according to the embodiment of the present invention.

As illustrated in FIG. 6, the article inspection unit 3 is configured to include a light irradiation unit 31 and a light detection unit 32. The article inspection unit 3 irradiates the tablet W stored in the storage groove 12B with a broadband light L from the light irradiation unit 31 at the article inspection position P5 from the opening portion 12c side, and the light transmitted through the tablet W is detected by the light detection unit 32.

The light irradiation unit 31 is provided with a light source 31a, a light guide 31b, and a condenser lens 31c. The light source 31a is configured to include, for example, a halogen lamp in order to irradiate the tablet W to be inspected with a broadband light. The light source 31a, the light guide 31b, and the condenser lens 31c constitute a light source unit integrally assembled together with a case (not illustrated) in which heat radiation fins (not illustrated) are formed, and the light source unit is attached to the main body frame that supports the supply container 10. The light source unit is provided with an optical sensor (not illustrated) that measures the amount of light of the light source 31a, and a temperature sensor (not illustrated) that measures the temperature of the light source 31a.

The light guide 31b is configured by bundling multiple glass optical fibers and guides the light from the light source 31a to the condenser lens 31c that collects the light. The condenser lens 31c collects the light from the light guide 31b onto the tablet W at the article inspection position P5.

The light irradiation unit 31 emits a broadband light from the light source 31a to the condenser lens 31c via the light guide 31b, adjusts the magnification of the condenser lens 31c (position of the condenser lens 31c, the light source 31a, and the tablet W) so that the light irradiation unit 31 covers the entire upper surface of the tablet W at the article inspection position P5 by the condenser lens 31c, and efficiently irradiates the tablet W with the light from the light source 31a at the article inspection position P5.

The light detection unit 32 constitutes a light detection unit integrally assembled with an optical fiber 32a and a spectroscope 32b, and is integrally held by a holding means (not illustrated) and attached to the main body frame that support the supply container 10.

In the light detection unit 32, the light transmitted through the tablet W at the article inspection position P5 enters from the end surface (incident opening portion) of the incident surface as the light receiving unit of the optical fiber 32a. When the light entering from the end surface of the incident surface passes through the optical fiber 32a and reaches the spectroscope 32b, the spectroscope 32b performs spectroscopy by glazing using the difference in the diffraction angle depending on the wavelength of the light.

The article inspection unit 3 processes the signal of the spectral characteristics obtained by the light detection unit 32, and determines the quality of the tablet W from the result of processing the signal.

At the article inspection position P5, a light-shielding plate 39 having an opening portion 39a through which light can pass may be installed between the storage groove 12B and the light detection unit 32 (the light-shielding plate 39 is illustrated by a virtual line in FIG. 6). In this manner, the detoured light from the outer peripheral side surface Wa (refer to FIG. 4) of the tablet W toward the light detection unit 32 can be more reliably blocked by the peripheral wall 12D and the light-shielding plate 39, and appropriate light analysis can be more reliably performed by the light detection unit 32.

As illustrated in FIG. 1, an NG product collection unit 35, an all product collection unit 36, and an OK product collection unit 37 are provided on the downstream side in the rotation direction of the outer transport unit 12 from the article inspection position P5 at predetermined intervals in the rotation direction of the outer transport unit 12.

When the article inspection unit 3 determines that the tablet W is a defective product (NG product), and the tablet W determined to be the defective product is transported to an NG product selection position P6 on the downstream side in the rotation direction of the outer transport unit 12 with respect to the article inspection unit 3, for example, the article transport device 2 blows air onto the tablet W from the inside of the outer transport unit 12 in the radial direction and discharges the tablet W from the storage groove 12B to the NG product collection unit 35. The tablet W may be picked up from the outside of the outer transport unit 12 in the radial direction at the NG product selection position P6 and discharged from the storage groove 12B to the NG product collection unit 35.

On the other hand, when the article inspection unit 3 determines that the tablet W is a normal product (OK product), and the tablet W determined to be the normal product is transported from the NG product selection position P6 to an OK product selection position P7, for example, air is blown onto the tablet W from the inside of the outer transport unit 12 in the radial direction and the tablet W is discharged from the storage groove 12B to the OK product collection unit 37. The tablet W may be picked up from the outside of the outer transport unit 12 in the radial direction at the OK product selection position P7 and discharged from the storage groove 12B to the OK product collection unit 37.

The all product collection unit 36 is provided at a total discharge position P8 between the NG product selection position P6 and the OK product selection position P7 in the rotation direction of the outer transport unit 12.

The all product collection unit 36 collects a tablet W that could not be inspected normally or failed to be discharged, such as a tablet W failed to discharge NG, at the start of operation of the article inspection apparatus 1, after the return operation after an emergency stop, and the like, and for example, blows air onto the tablet W from the inside of the outer transport unit 12 in the radial direction and discharges the tablet W from the storage groove 12B to the all product collection unit 36.

The tablet W may be picked up from the outside of the outer transport unit 12 in the radial direction at the total discharge position P8 and discharged from the storage groove 12B to the all product collection unit 36.

In addition, a confirmation sensor 38 may be provided at a confirmation position P9 on the downstream side of the NG product collection unit 35 in the rotation direction of the outer transport unit 12, and the confirmation sensor 38 may be used to confirm whether or not a defective product is discharged at the NG product selection position P6. In this manner, the reliability of selection the defective product can be improved.

Figure 7:
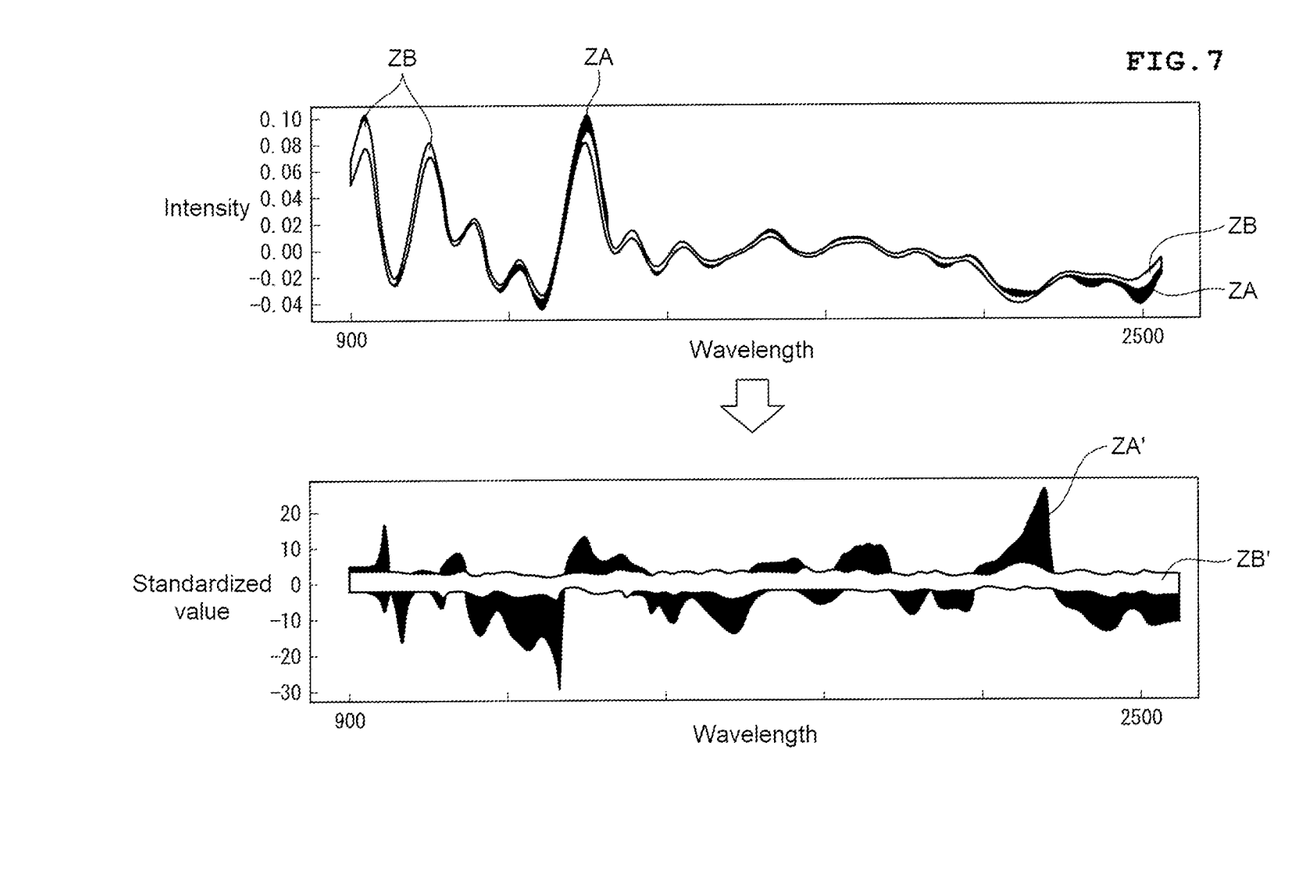
FIG. 7 is a graph illustrating an example of standardization of a spectrum of spectral characteristics of the article inspection apparatus according to the embodiment of the present invention.

The spectrum of the spectral characteristics obtained by the light detection unit 32 of the article inspection unit 3 is displayed on a display device (not illustrated) and is illustrated in the upper part of FIG. 7. In FIG. 7, the spectrum of a plurality of tablets W is superimposed and graphed. In this spectrum, a black-painted spectrum indicated by ZA is a spectrum of the defective product, and a blank portion indicated by ZB is a spectrum of the normal product.

In the present embodiment, the article inspection unit 3 standardizes the measured values for each wavelength of the measured spectrum, and determines whether the article is a normal product or a defective product based on the standardized values.

The article inspection unit 3 calculates, for example, statistical values such as an average value, a maximum value, a minimum value, and a standard deviation for each wavelength of the measured values of the wavelengths in a measurement range at the wavelengths at predetermined intervals, and standardizes by calculating (measured value−average value)/standard deviation and the like, as illustrated in the lower part of FIG. 7. There are various methods for standardization, but when the statistical value is calculated using the measurement result using the OK product and the standardization is calculated from the statistical value, a method that does not increase the fluctuation of the values when the measured values of OK products not used in the calculation are standardized is selected.

The standardization calculation may be (measured value−average value)/(maximum value−minimum value), (measured value−maximum value)/standard deviation, or the like. At this time, the statistical value is obtained from the result of measurement using a normal product known to be normal. In addition, the statistical value of the normal product may be used as the statistical value, and in a case where the spectral spectrum of the normal product has changed due to a change in lot or the like, the statistical value may be calculated by adding the latest measured value of the normal product to the measured value of the same tablet W inspected in the past. In addition, in a case where a numerical value that can be used for standardization such as spectral characteristics and the variation is known as a known value instead of a statistical value, the value may be used for standardization.

By performing such standardization, the spectrum illustrated in the upper part of FIG. 7 is converted as illustrated in the lower part. In the graph, the black part indicated by ZA' is the standardized value of the defective product, the blank part indicated by ZB' is the standardized value of the normal product, and compared with the case of the spectrum, it is possible to easily determine whether the article is a normal product or a defective product.

The graph display format illustrated in FIG. 7 is an example, and can be expressed in various display formats such as a radar chart and expression by shades of color. The radar chart displays the results of the calibration curve, standardized values for each spectral wavelength, and for example, thickness values measured by other measuring instruments.

In addition, the color, line thickness, and display style (for example, solid line, broken line, dashed line, circle, square, and the like) may be changed and displayed depending on the case where the determination is OK, the case where the determination is NG, or the level of NG.

In addition, the number of display data (for example, the latest 1 item, the latest 100 items, and the like) and the type of data to be displayed (for example, OK only, NG only, all, and the like) may be combined and displayed.

For example, the article inspection unit 3 sets one predetermined threshold value in the entire wavelength range of the measurement range, and in a case where the standardized value of the measured value exceeds the threshold value at any wavelength, it is determined that the article is a defective product.

For example, the predetermined threshold value is determined from the value by calculating a standardized value from a spectrum of a plurality of normal products as illustrated in the lower part of FIG. 7. For example, the predetermined threshold value is set to twice the maximum value, twice the minimum value of the value of the normal product after standardization, an intermediate value between the maximum value of the normal product and the minimum value of the defective product, or a value capable of identifying a defective product. In addition, these values may be automatically set.

In addition, the display data to be determined to be OK may be selected, and the threshold value may be automatically readjusted so that the determination is OK. At this time, it may be selected whether to recalculate the statistical values used for standardization.

In addition, the display data determined to be NG may be selected, and the threshold value may be automatically readjusted so that the determination is OK.

As the spectrum of a normal product for determining a predetermined threshold value, spectral information or the result of using spectrum conversion processing such as absorbance calculation, smoothing processing, or differential calculation (may be multiple stages) may be used.

The absorbance calculation is processing of calculating the attenuation of the work result from the reference when the spectral characteristics of the light used to measure the tablet W and the spectral characteristics when the prototype is measured are used as references, and the spectral characteristics when the tablet W is measured are used as the work result.

The smoothing processing is processing of smoothing data of each of the wavelengths adjacent to each other by averaging, filtering processing (load moving average method), or the like.

The differential calculation is difference processing between data at fixed intervals by taking over a specific rule such as adjacent wavelength data and wavelength data at specific intervals.

A plurality of spectra of the result of such conversion processing may be used to determine whether the article is a normal product or a defective product. In this case, the predetermined threshold value may be different depending on the conversion processing.

In addition, since the spectral information changes due to environmental changes such as the ambient temperature, the temperature of the spectroscope 32b, the temperature of the device, and the amount of light of the light source 31a, a predetermined threshold value may be switched depending on information other than the spectrum, for example, the ambient temperature, the temperature of the spectroscope 32b, the temperature of the device, the amount of light of the light source 31a, and the like.

For example, in a case of switching by temperature, the normalization value and limit at 20° C. to 30° C. and the normalization value and limit at 30° C. to 35° C. are measured and calculated in advance, the temperature change is observed during the inspection, the normalization value and the limit are switched depending on the value, and it is determined whether the article is a normal product or a defective product.

Figure 8:
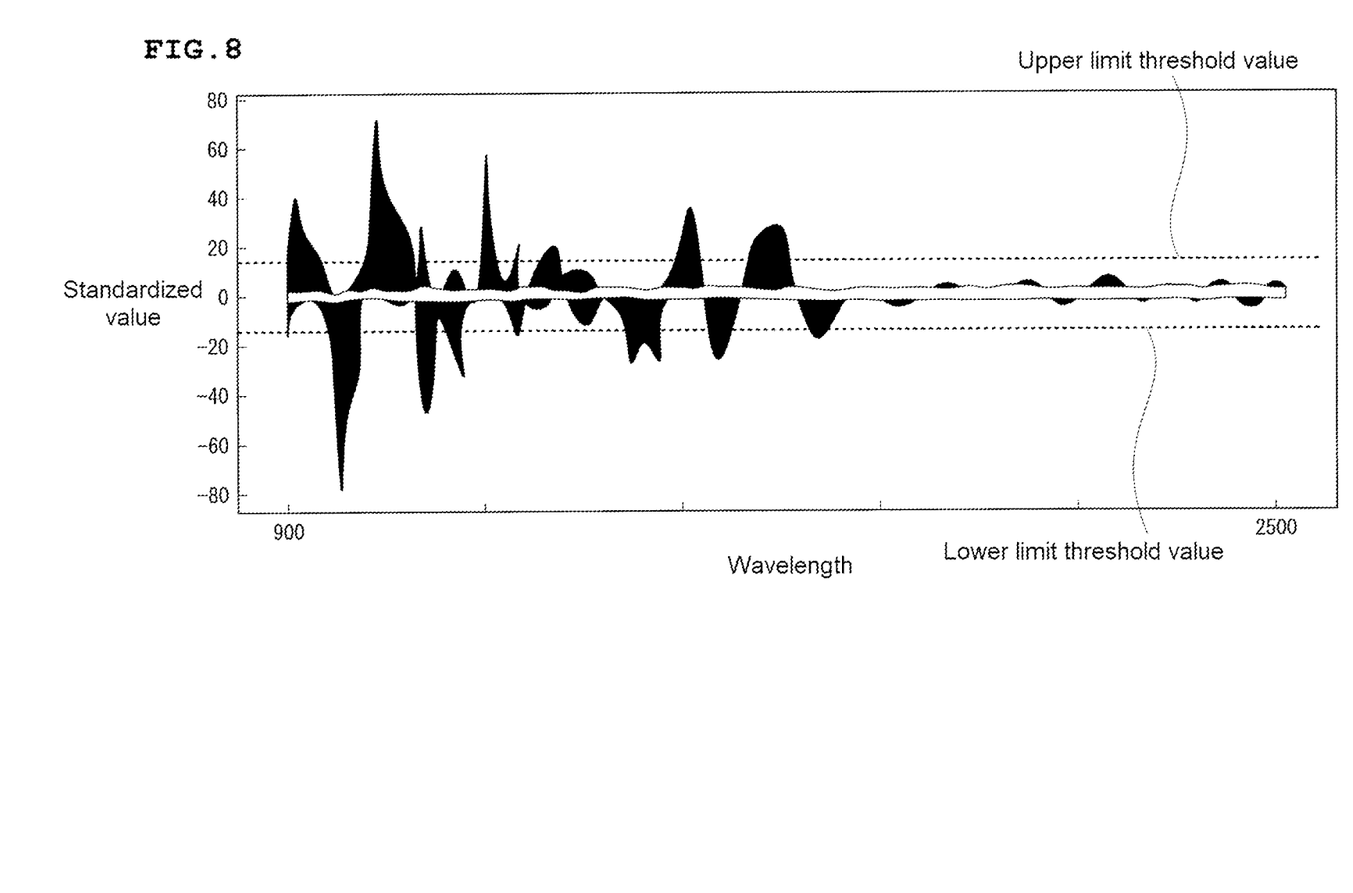
FIG. 8 is a graph illustrating an example of a threshold value of a value after standardization of the article inspection apparatus according to the embodiment of the present invention.

In addition, as illustrated in FIG. 8, the predetermined threshold value is provided with an upper limit threshold value and a lower limit threshold value, and in a case where the standardized value of the measured value for any wavelength exceeds the upper limit threshold value, or in a case where the standardized value of the measured value for any wavelength is below the lower limit threshold value, the article inspection unit 3 may determine that the article is a defective product.

The upper limit threshold value and the lower limit threshold value may be, for example, twice the maximum value of the normal product after standardization as the upper limit threshold value, twice the minimum value as the lower limit threshold value, or may be set by another method. In addition, these values may be automatically set.

Figure 9:
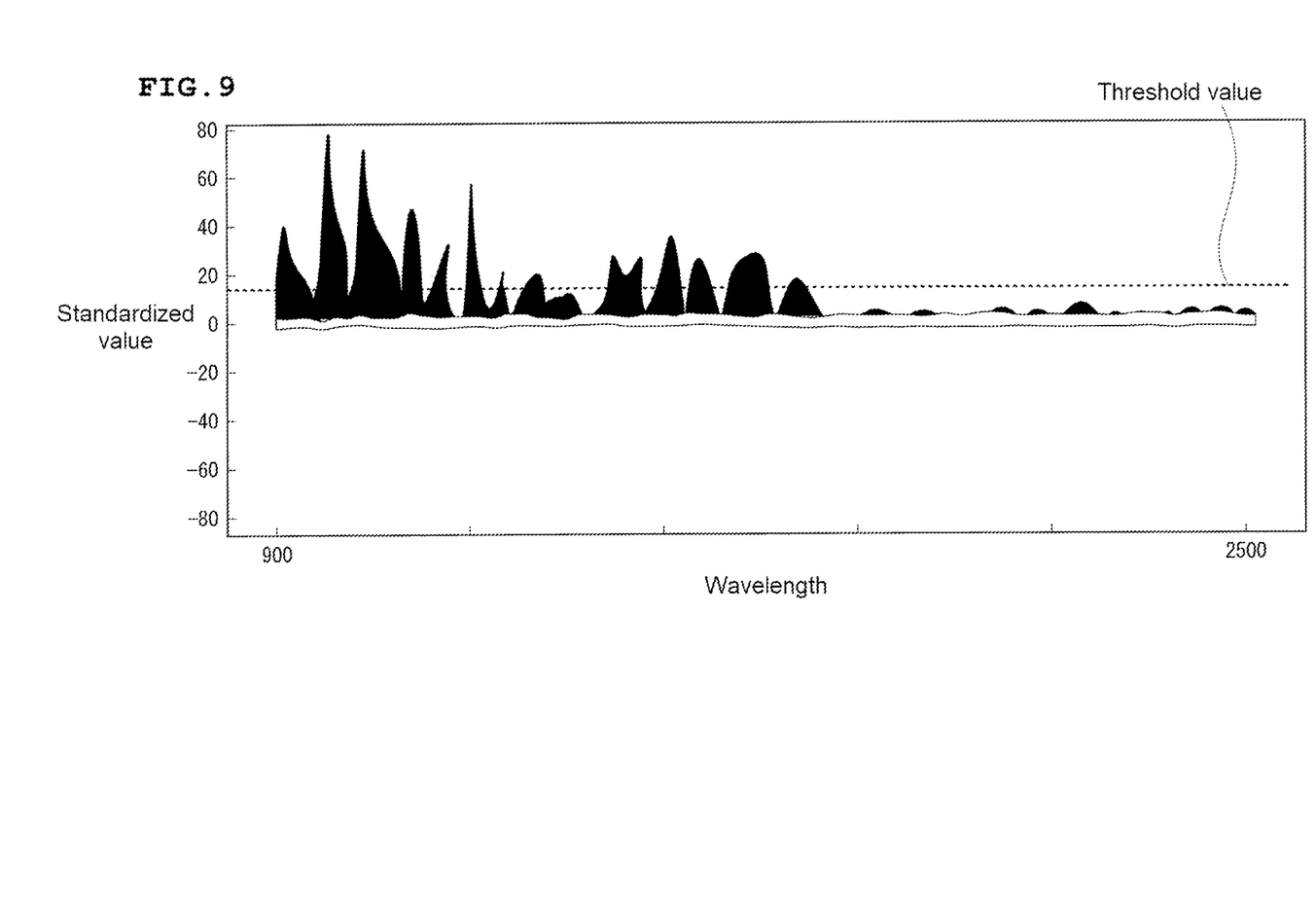
FIG. 9 is a graph illustrating an example of a threshold value based on an absolute value of a value after standardization of the article inspection apparatus according to the embodiment of the present invention.

In addition, as illustrated in FIG. 9, by making the standardized value an absolute value, the lower limit threshold value may be eliminated and the threshold value may be set to one.

Figure 10:
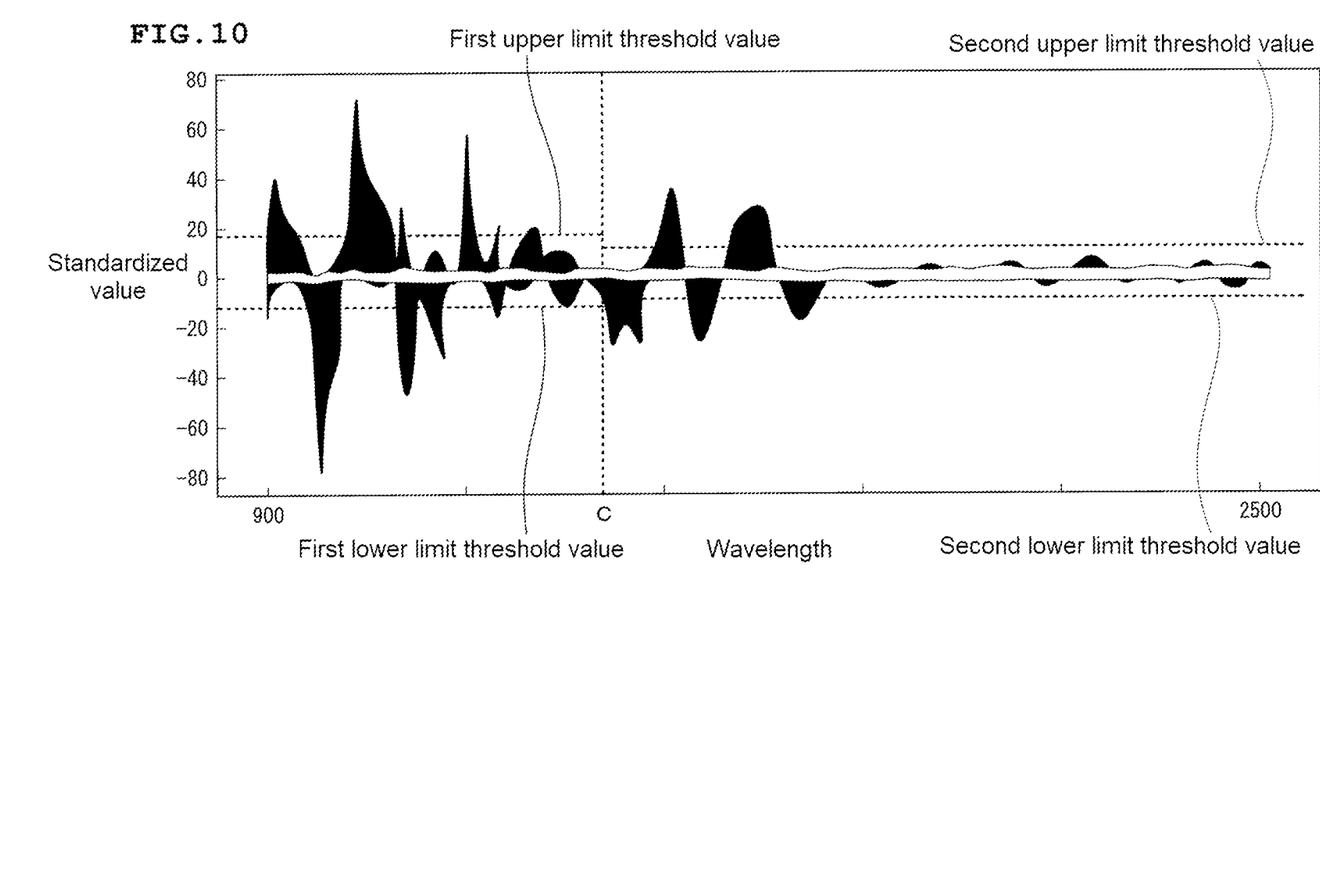
FIG. 10 is a graph illustrating an example in which the threshold value of a value after standardization of the article inspection apparatus according to the embodiment of the present invention is divided in the wavelength direction.

In addition, a predetermined threshold value may be set for each divided range of wavelengths by dividing the wavelength direction. For example, as illustrated in FIG. 10, the wavelength is divided by the boundary wavelength illustrated by C in the figure, the threshold value of the shorter wavelength is set as the first upper limit threshold value and the first lower limit threshold value, and the threshold value of the longer wavelength is set as the second upper limit threshold value and the second lower limit threshold value. The number of divisions may be two or more.

In this manner, for example, even in a normal product, in a case where there is a region where the influence value is large and a region where the influence value is small, the threshold value is set to be large in the region where the influence value is large, the threshold value is set to be small in the region where the influence value is small, and it is possible to accurately determine whether the article is a normal product or a defective product.

Figure 11:
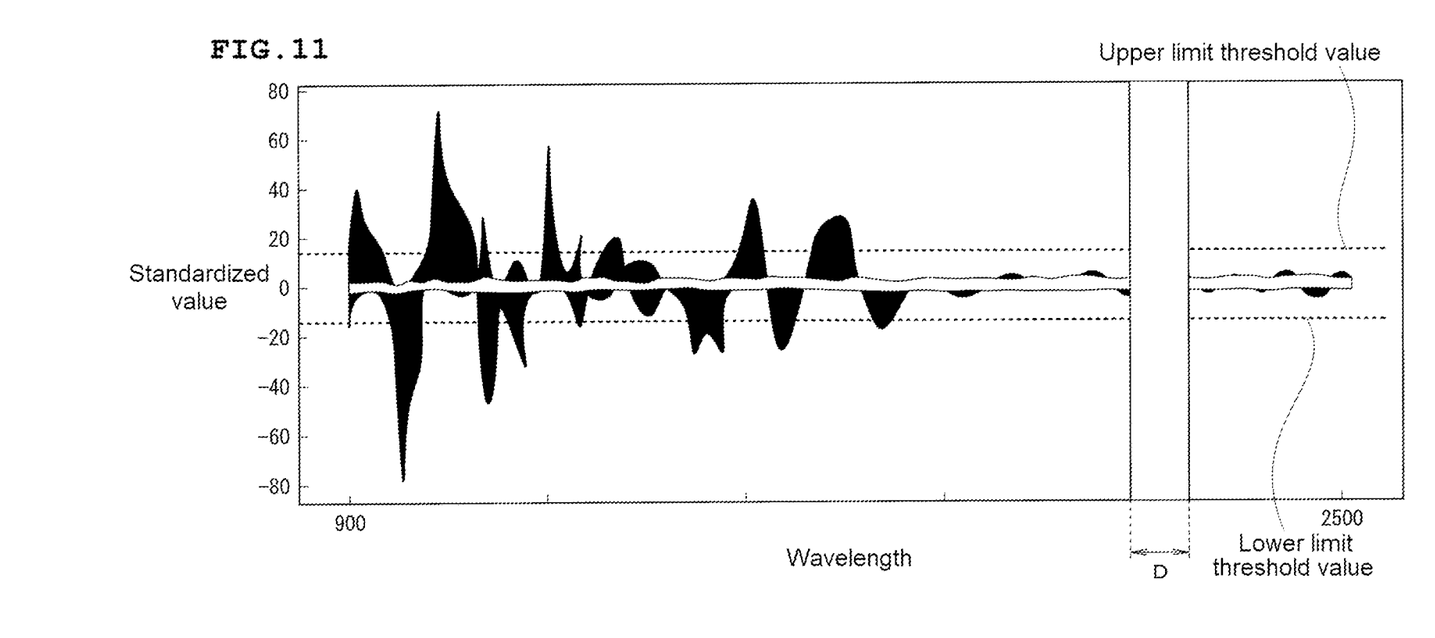
FIG. 11 is a graph illustrating an example of providing a range of wavelengths in which a normal product or a defective product is not determined based on a threshold value of a value after standardization of the article inspection apparatus according to the embodiment of the present invention.

In addition, a range where the determination by the threshold value is not performed may be provided. For example, as illustrated in FIG. 11, in a range of wavelengths illustrated by D in the figure, for example, a spectrum measured in a specific range of wavelengths illustrates a waveform having a different tendency from a spectrum measured in another range of wavelengths without performing determination by a threshold value. When the operator determines that a value for distinguishing and judging between a normal product and a defective product cannot be obtained or it may not be possible to correctly distinguish between a normal product and a defective product, the standardized values of the measured values in such range are set not to be used for the determination.

As described above, in the above-described embodiment, the article inspection unit 3 standardizes the measured value for each wavelength of the measured spectrum, and determines whether the article is a normal product or a defective product based on the standardized values.

As a result, the measured value for each wavelength of the measured spectrum is standardized, and the standardized value is used to determine whether the article is a normal product or a defective product. Therefore, when an unspecified foreign substance is contained, the change in the spectrum can be sensitively and stably detected, and the article can be determined as a defective product.

In addition, the article inspection unit 3 calculates the statistical value of the measured value for each wavelength of the spectrum of the spectral characteristics of the light detected by the light detection unit 32, and standardizes the measured value for each wavelength based on the statistical value.

As a result, the statistical value of the measured value for each wavelength of the spectrum of the spectral characteristics of the light detected by the light detection unit 32 is calculated, and the measured value for each wavelength is standardized based on the statistical value. Therefore, when an unspecified foreign substance is contained, the change in the spectrum can be sensitively and stably detected, and the article can be determined as a defective product.

In addition, the article inspection unit 3 determines whether the tablet W is a normal product or a defective product based on the threshold value for the standardized value.

As a result, it is determined whether the tablet W is a normal product or a defective product based on the threshold value for the standardized value. Therefore, it is possible to easily determine whether the tablet W is a normal product or a defective product.

In addition, as the threshold value for the standardized value, the article inspection unit 3 is provided with an upper limit threshold value which is an upper limit value for determining that the standardized value is normal, and a lower limit threshold value which is a lower limit value for determining that the standardized value is normal.

As a result, it is determined whether the tablet W is a normal product or a defective product based on the upper limit threshold value and the lower limit threshold value. Therefore, it is possible to easily and accurately determine whether the tablet W is a normal product or a defective product.

In addition, the article inspection unit 3 determines whether the tablet W is a normal product or a defective product based on the threshold value for the absolute value of the standardized value.

As a result, it is determined whether the tablet W is a normal product or a defective product based on the threshold value for the absolute value of the standardized value. Therefore, it is possible to easily determine whether the tablet W is a normal product or a defective product by combining the upper limit and lower limit threshold values into one.

In addition, the article inspection unit 3 sets a threshold value for the standardized value for each range divided in the wavelength direction.

As a result, the threshold value is set for each range divided in the wavelength direction. Therefore, depending on the characteristics of the tablet W, a normal range can be narrowed or widened for each range of wavelengths, and it is possible to accurately determine whether the tablet W is a normal product or a defective product.

In addition, the article inspection unit 3 is provided with a range of wavelengths in which it is not determined whether the tablet W is a normal product or a defective product by using the threshold value.

As a result, the range of wavelengths is provided in which it is not determined whether the tablet W is a normal product or a defective product based on the threshold value. Therefore, a range of wavelengths that is not related to the determination of whether the tablet W is a normal product or a defective product can be set as a range in which it is not determined whether the tablet W is a normal product or a defective product, and it is possible to accurately determine whether the tablet W is a normal product or a defective product by suppressing the influence of the value in the range of wavelengths that is not related to the determination.

In addition, the threshold value is set based on the standardized value of the measured value of the normal product of the tablet W.

As a result, the threshold value is set based on the standardized value of the measured value of the normal product of the tablet W. Therefore, the threshold value can be set by reflecting the characteristics of the normal product, and it is possible to accurately determine whether the tablet W is a normal product or a defective product.

In addition, the article inspection unit 3 standardizes the value of the result obtained by performing the spectrum conversion processing on the spectrum of the spectral characteristics of the light detected by the light detection unit 32 for each wavelength, and determines whether the tablet W is a normal product or a defective product based on the standardized value.

As a result, the value of the result obtained by performing the spectrum conversion processing on the spectrum of the spectral characteristics of the light detected by the light detection unit 32 is standardized for each wavelength, and it is determined whether the tablet W is a normal product or a defective product based on the standardized value. Therefore, when an unspecified foreign substance is contained, the change in the spectrum can be sensitively and stably detected, and the tablet W can be determined as a defective product.

In the present embodiment, the case where the light of the light irradiation unit 31 is transmitted to the tablet W and the quality of the tablet W is inspected based on the spectral characteristics of the transmitted light is illustrated, and the same can be applied even in a case where the light of the light irradiation unit 31 is reflected on the tablet W and the quality of the tablet W is inspected based on the spectral characteristics of the reflected light.

In addition, the measured spectral information can be stored, the spectral conversion processing such as absorbance calculation, smoothing processing, and differential processing can be performed from the spectral information after the measurement, calculation processing to create a calibration curve can be performed by the magnitude of a specific peak, machine learning, and the like, and complex discrimination processing such as a discrimination method using a calibration curve can be performed.

In addition, the configuration of the article transport device 2 illustrated in FIGS. 1 to 5 is an example, and it goes without saying that another configuration may be used. The tablet W may be sequentially transported to the article inspection position P5 of the article inspection unit 3.

Although embodiments of the invention have been disclosed, it will be apparent to those skilled in the art that modifications may be made without departing from the scope of the invention. All such modifications and equivalents are intended to be included in the following aspects.

DESCRIPTION OF REFERENCE NUMERALS AND SIGNS

1 Article inspection apparatus
2 Article transport device
3 Article inspection unit
12 Outer transport unit (transport unit)
12B Storage groove (storage portion)
31 Light irradiation unit
31*a* Light source
31*b* Light guide
31*c* Condenser lens
32 Light detection unit
32*a* Optical fiber
32*b* Spectroscope
P5 Article inspection position

What is claimed is:
1. An article inspection apparatus comprising:
a transport path configured to transport an article for inspection to an article inspection position;
a light irradiation emitter configured to irradiate the article transported to the article inspection position with light;
a light detector configured to detect light transmitted through or reflected from the article; and a spectrum analyzer configured to inspect a quality of the article based on spectral characteristics of the light detected by the light detector, wherein the spectrum analyzer is configured to standardize a measured value of a spectrum of the light detected by the light detector for each wavelength and to determine whether the article is a normal product or a defective product based on a standardized value, wherein the spectrum analyzer is configured to determine whether the article is the normal product or the defective product based on a threshold value for the standardized value, wherein the spectrum analyzer is configured to set the threshold value for the standardized value for each range divided in a wavelength direction.

2. The article inspection apparatus according to claim 1, wherein

The spectrum analyzer is configured to calculate a statistical value of the measured value for each wavelength of the spectrum of the light detected by the light detector, and to standardize the measured values for each wavelength based on the statistical value.

3. The article inspection apparatus according to claim 1, wherein the spectrum analyzer is configured to set, as the threshold value for the standardized value, an upper limit threshold value which is an upper limit value for determining that the standardized value is normal and a lower limit threshold value which is a lower limit value for determining that the standardized value is normal.

4. The article inspection apparatus according to claim 1, wherein the spectrum analyzer is configured to determine whether the article is a normal product or a defective product based on a threshold value for an absolute value of the standardized value.

5. The article inspection apparatus according to claim 1, wherein the threshold value is set based on a standardized value of a measured value of a normal product of the article.

6. An article inspection apparatus comprising:

a transport path configured to transport an article for inspection to an article inspection position;

a light irradiation emitter configured to irradiate the article transported to the article inspection position with light a light detector configured to detect light transmitted through or reflected from the article; and a spectrum analyzer configured to inspect a quality of the article based on spectral characteristics of the light detected by the light detector, wherein the spectrum analyzer is configured to standardize measured values of a spectrum of the light detected by the light detector for each wavelength to generate standardized values, and to determine whether the article is a normal product or a defective product based on a standardized value, wherein the spectrum analyzer is configured to determine whether the article is the normal product or the defective product based on a threshold value for each standardized value, wherein the spectrum analyzer is configured to set a range of wavelengths in which it is not determined whether the article is the normal product or the defective product by using the threshold value.

7. The article inspection apparatus according to claim 1, wherein the spectrum analyzer is configured to standardize a value of a result obtained by performing spectrum conversion processing on the spectrum of the light detected by the light detector for each wavelength, and to determine whether the article is the normal product or the defective product based on the standardized value.

8. The article inspection apparatus according to claim 6, wherein the spectrum analyzer is configured to calculate a statistical value of the measured value for each wavelength of the spectrum of the light detected by the light detector, and to standardize the measured values for each wavelength based on the statistical value.

9. The article inspection apparatus according to claim 6, wherein the spectrum analyzer is configured to set, as the threshold value for the standardized value, an upper limit threshold value which is an upper limit value for determining that the standardized value is normal and a lower limit threshold value which is a lower limit value for determining that the standardized value is normal.

10. The article inspection apparatus according to claim 6, wherein the spectrum analyzer is configured to determine whether the article is a normal product or a defective product based on a threshold value for an absolute value of the standardized value.

11. The article inspection apparatus according to claim 6, wherein the threshold value is set based on a standardized value of a measured value of a normal product of the article.

12. The article inspection apparatus according to claim 6, wherein the spectrum analyzer is configured to standardize a value of a result obtained by performing spectrum conversion processing on the spectrum of the light detected by the light detector for each wavelength, and to determine whether the article is the normal product or the defective product based on the standardized value.

* * * * *